METHOD OF CONVERTING ALPHA PHTHALOCYANINE TO THE X-FORM
Original Filed July 21, 1966
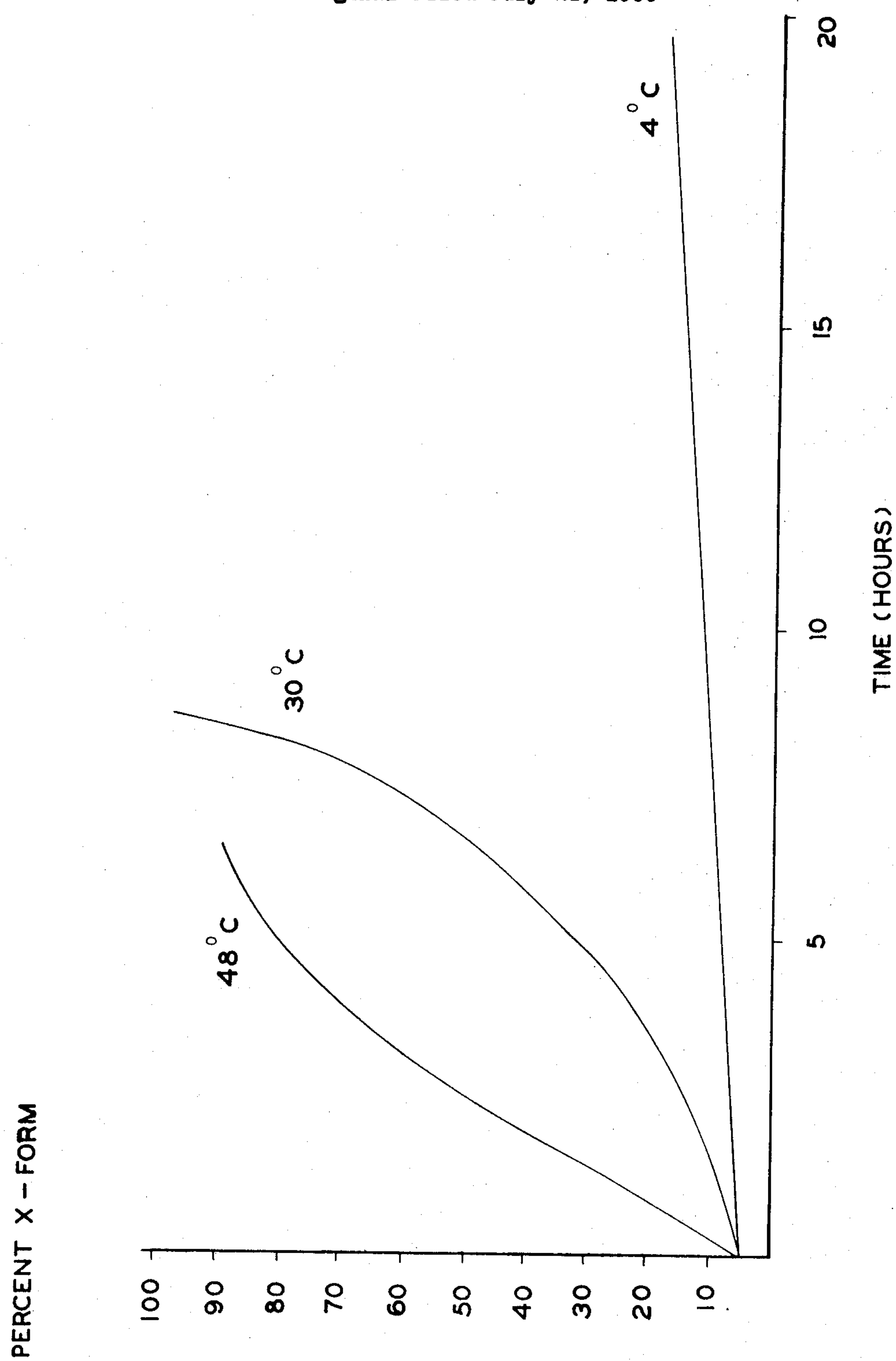
INVENTOR.
RICHARD W. RADLER
BY John R. Duncan
James J. Ralabate
ATTORNEYS United States Patent Office 3,594,163

Patented July 20, 1971

3,594,163

METHOD OF CONVERTING ALPHA PHTHALOCYANINE TO THE X-FORM

Richard W. Radler, Jr., Penfield, N.Y., assignor to Xerox Corporation, Rochester, N.Y.

Continuation of abandoned application Ser. No. 566,839, July 21, 1966. This application Feb. 13, 1970, Ser. No. 10,077

Int. Cl. C09b *47/04*

U.S. Cl. 96—1.5 9 Claims

ABSTRACT OF THE DISCLOSURE

A method of preparing X-form phthalocyanine which comprises crystal conversion from alpha phthalocyanine in organic solvents seeded with small amounts of X-form is disclosed.

This application is a continuation of application Ser. No. 566,839, filed July 21, 1966 and now abandoned.

This invention relates to phthalocyanine photoconductive materials, and more particularly, to a new process for preparing an especially sensitive form of phthalocyanine.

It is known that images may be formed and developed on the surface of certain photoconductive materials by electrostatic means. The basic xerographic process, as taught by Carlson in U.S. Pat. 2,297,691, involves uniformly charging a photoconductive insulating layer and then exposing the layer to a light-and-shadow image which dissipates charge on the portions of the layer which are exposed to light. The electrostatic image formed on the layer corresponds to the configuration of the light-and-shadow image. This image is rendered visible by depositing on the imaged layer a finely divided developing material comprising a colorant called a toner and a toner carrier. The powder developing carrier will normally be attracted to those portions of the layer which retain a charge, thereby forming a powder image corresponding to the latent electrostatic image. This powder image may then be transferred to paper and other receiving surfaces. The paper then will bear the powder image which may subsequently be made permanent by heating or other suitable fixing means. The above general process is also described in U.S. Pats. 2,357,809; 2,891,011; and 3,079,342.

It has recently been found that an especially sensitive electrophotographic plate may be prepared by mixing metal-free phthalocyanine in a binder, coating the mixture onto a conductive substrate and hardening the binder. Electrophotographic plates comprising phthalocyanines in a binder are described in detail in copending applications Serial No. 375,191, filed June 15, 1964 now abandoned, and Ser. No. 518,450, filed Jan. 3, 1966, which is a continuation-in-part of application Ser. No. 375,191. It was found that an especially sensitive form of metal-free phthalocyanine could be prepared by extended dry milling or grinding of alpha or beta form metal-free phthalocyanine. This highly sensitive material was found to be a new polymorphic form of phthalocyanine. This new polymorph, now referred to as "X-form" phthalocyanine is described in detail and claimed in U.S. Pat. 3,357,989. While the X-form phthalocyanine produced by grinding or milling has excellent physical properties, this method of preparation has several disadvantages. In order to get complete conversion from alpha or beta phthalocyanine to X-form phthalocyanine often requires very extended periods of milling, often over 100 hours. Besides being time consuming, this process consumes a large amount of power and requires large and sometimes complex milling equipment. Also, impurities may be introduced into the phthalocyanine dispersion from the metallic or ceramic milling equipment. It is very difficult to predict the milling time or total work required in a particular milling machine to insure complete conversion to X-form phthalocyanine. When changes are made in milling equipment or techniques, test runs must be made with frequent sampling and X-ray or infrared examination to detect when complete conversion has been attained.

Since large quantities of X-form phthalocyanine may be needed for electrophotographic or other uses, there is a continuing need for a simpler, cheaper, and more reproduceable method of converting other forms of phthalocyanine to the X-form.

It is, therefore, an object of this invention is to provide a method for preparing X-form phthalocyanine devoid of the above noted disadvantages.

It is another object of this invention to provide a method for preparing X-form phthalocyanine which does not require great amounts of work in energy.

It is a further object of this invention to provide a rapid, economical method of preparing X-form phthalocyanine.

The above objects and others are accomplished in accordance with this invention, fundamentally, by providing a method of preparing X-form phthalocyanine which comprises crystal conversion from alpha phthalocyanine in organic solvents seeded with small amounts of X-form. Ordinarily, this procedure comprises adding up to 20 percent by weight of X-phthalocyanine to particulate alpha phthalocyanine and mixing these for a suitable period in an organic solvent. Alternatively, the mixture comprising a small amount of X-phthalocyanine in alpha phthaloanine may be converted to 100% X-phthalocyanine by allowing a solution containing an organic binder resin to age for several hours. The solution is then coated onto a suitable substrate. Here, the final product is a hard layer comprising X-form phthalocyanine dispersed in a resin binder. This layer is suitable for use in electrophotographic imaging as described in above mentioned application Ser. No. 375,191.

The advantages of the invention may be further understood upon reference to the drawing, which shows comparative conversion time.

Referring now to the figure, a graph of percentage conversion from the "alpha" to the "X" polymorphic form is seen. Percent conversion is indicated along the vertical axis, while time is indicated along the horizontal axis. Details of the conversion process are given in the examples, below. As can be seen from the curves, conversion is rapid at 48° C., moderately fast at 30° C. and slow at 4° C.

Where the phthalocyanine raw material is impure and contains metal atoms, it may be purified and converted to the alpha form of metal-free phthalocyanine by any conventional process. Typical purification and conversion processes are described by F. H. Moser and A. L. Thomas in "Phthalocyanine Compounds," Reinhold Publishing Corporation, New York.

Any suitable organic solvent may be used in either the direct solvent conversion process or in the solvent-binder resin process described above. It has been found that especially rapid and complete conversion is obtained with aliphatic solvents having a Carbonyl group (=C=O). These, therefore, constitute a preferred group of solvents. Typical of these are methyl ethyl ketone, methyl isobutyl ketone, butylaldehyde, ethyl acetate, ethyl propionate, acetic acid, acetone and mixtures thereof. In the direct solvent conversion process, methyl ethyl ketone has been found to give the most rapid conversion and is therefore considered to be the optimum solvent. Where desired, however, any other suitable solvent, such as acetonitrile may be used. In the solvent-binder resin system, a mixture of methyl isobutyl ketone, methyl ethyl ketone and an epoxy phenolic resin has been found to give both excellent crystal conversion and to produce a tough durable layer when coated on a substrate and cured. Any other suitable solvent and/or resin may be used, if desired. In general, aromatic solvents are not preferred because of the tendency of such solvents to convert phthalocyanine to the beta form. The above described compositions are referred to as "solvents" because this is their usual commercial grouping. However, it is preferred that the "solvents" used in the process of this invention not appreciably dissolve phthalocyanine.

Any suitable mixing process may be used to slurry the phthalocyanine particles in the solvent and/or resin mix. In fact, it has been found that merely dispersing the phthalocyanines in the solvent and allowing the mixture to stand will give substantial conversion to the X-form. However, more complete conversion in a shorter period of time is attained where the mixture is stirred during the conversion period. The mixing may be carried out, for example, by milling with glass or steel balls or merely by stirring such as with a magnetic bar or simple rotating agitator.

Alpha form metal-free phthalocyanine suitable for conversion to X-form by the methods of this invention may be prepared by any conventional method. Any of the synthesis described by F. H. Moser and A. L. Thomas in "Phthalocyanine Compounds," Rheinhold Publishing Corporation, New York, 1964, may be used as desired. The small proportion of X-form phthalocyanine used to seed the alpha phthalocyanine in the conversion process may be prepared either by the processes described herein or by those described in above-mentioned copending application Ser. No. 505,723.

The following examples further specifically define the persent invention with respect to the processes of nucleated solvent crystallization of X-form phthalocyanine. Parts and percentages are by weight unless otherwise indicated. The examples below are intended to illustrate various preferred embodiments of the processes of the present invention.

The crystal forms of the phthalocyanine produced in each of the following examples is analyzed by conventional X-ray and infrared analysis methods. The X-ray and infrared curves produced by the materials produced in each of the following examples is compared to curves for known alpha, beta and X-form phthalocyanine as described in detail in above-mentioned copending application Ser. No. 505,723.

EXAMPLE I

About 95 parts of alpha-form metal-free phthalocyanine, obtained from Holland Suco Color Company is mixed with about 5 parts X-form phthalocyanine prepared by the method described in Example I of copending application Ser. No. 505,723, and about 2,000 parts methyl ethyl ketone. The mixture is placed in a glass ballmill jar with glass balls and rotated for about 16 hours at about 70 r.p.m. The mixture is then removed, filtered, dried and subjected to conventional X-ray analysis. Analysis shows complete conversion to the X-form phthalocyanine.

EXAMPLE II

As a control for the conversion process of Example I, about 100 parts of alpha form, metal-free phthalocyanine from Holland Suco Color Company is mixed in about 2,000 parts methyl ethyl ketone and ball milled as in Example I. X-ray and infrared analysis of the product shows that there is no conversion from alpha to X-form phthalocyanine where the original mixture was not seeded with a small proportion of X-form.

EXAMPLE III

A dispersion of alpha and X-form of phthalocyanine in methyl ethyl ketone is prepared as in Example I. The dispersion is placed in a glass beaker, a magnetic bar is placed in the bottom of the beaker and is rotated by external magnetic means. Stirring of the dispersion is continued for about 16 hours. The phthalocyanine is then removed and dried. X-ray and infrared analysis of the product shows complete conversion to the X-form of phthalocyanine.

EXAMPLE IV

As a control for the conversion process of Example III, a dispersion of alpha metal-free phthalocyanine and methyl ethyl ketone is prepared as in Example II. This dispersion is placed in a glass beaker and mixed as in Example III. After 16 hours of mixing, the phthalocyanine is analyzed by X-ray and infrared means. No conversion to the X-form has occurred.

EXAMPLE V

An epoxy phenolic resin solution is prepared as follows: About 35 parts Epon–1007, an epoxy resin available from Shell Chemical Company is mixed with about 20 parts Methylon 75201 a phenolic resin available from the General Electric Company, about 4 parts Uformite–F240 a urea formaldehyde resin available from Rohm & Haas Chemical Company, about 30 parts of methyl isobutyl ketone and about 10 parts methyl ethyl ketone. To this resin solution is added about 9.5 parts of alpha-form metal-free phthalocyanine, obtained from Holland Suco Company, about 0.5 part of X-form phthalocyanine prepared as in Example I of copending application Ser. No. 505,723 and an additional 200 parts methyl ethyl ketone. The solution is briefly stirred to obtain a good mixture and then is allowed to stand for about 16 hours. The resin-phthalocyanine mixture is then coated onto a substrate and the resin is cured. Analysis by X-ray procedure shows complete conversion of the phthalocyanine to the X-form.

EXAMPLE VI

As a control for the conversion process of Example V, the process is repeated except that instead of the mixture of alpha and X-forms of phthalocyanine, 10 parts of alpha phthalocyanine alone is used. The product thus produced is analyzed and found to be alpha-form phthalocyanine with no conversion to X-form.

EXAMPLE VII

Four samples, each comprising 95 parts alpha and 5 parts X-form phthalocyanine are treated as in Example I, except that in place of the methyl ethyl ketone the samples are milled with ethyl acetate, acetic acid, acetone and methyl isobutyl ketone, respectively. After 16 hours milling, each sample is analyzed for crystal form by the X-ray procedure. Each sample is found to have converted to 100% X-form.

EXAMPLE VIII

The experiment of Example V is repeated, except that about 50 parts Bakelite VYHH, a vinyl chloride-vinyl acetate copolymer available from Union Carbide Corporation, in about 200 parts acetone is used in place of the epoxy phenolic resin solution. The phthalocyanine in the resulting coating is found to have entirely converted to the X-form.

EXAMPLE IX

Three samples are prepared and treated as follows:

(1) About 95 parts alpha and about 5 parts X-form phthalocyanine are mixed with about 2,000 parts methyl ethyl ketone in a flask connected with a reflux condenser held at about 48° C. The dispersion is stirred by means of a magnetic bar in the dispersion rotated by external magnetic means. Samples are withdrawn periodically and the percent conversion to X-form is determined by X-ray analysis. A curve of conversion against time is shown in the figure.

(2) A second sample, prepared as in (1) above, is maintained at about 30° C. during conversion. Again, samples are removed periodically and a curve of conversion against time is plotted.

(3) A third sample, prepared as in (1) above, is maintained at about 4° C. during conversion by means of a cooling coil in the suspension. Again, samples are removed, analyzed and plotted in the figure.

As indicated in the figure, conversion is more rapid at higher temperatures.

The below examples further specifically define the present invention with respect to the use of X-form phthalocyanine produced by the process of this invention in electrophotographic plates.

EXAMPLE X(a)

A mixture of alpha and X-forms of phthalocyanine is converted to entirely X-form as described in Example V. The resin-phthalocyanine mixture is coated onto an aluminum substrate to a thickness of about 10 microns and cured. The plate is charged in the dark by means of a corona discharge to a positive potential of about 400 volts. The charged plate is exposed for about 0.5 second to a light and shadow image using a Simmons Omega D3 Enlarger equipped with a tungsten light source operating at 2950° K. color temperature. Illumination level instant on the plate is one foot candle as measured with a Weston Illumination Meter Model No. 756. The latent electrostatic image is developed by cascading electroscopic developing powder over the plate surface as described by Walkup in U.S. Pat. 2,618,551. The powder image formed on the plate is electrostatically transferred to a receiving sheet and heat fused, as described by Schaffert in U.S. Pat. 2,576,047. The image on the receiving sheet is of excellent quality and corresponds to the original. The plate is wiped clean of any residual toner and is reused as in the above-described manner.

EXAMPLE X(b)

As a control, a resin-phthalocyanine mixture prepared as in Example VI, which did not convert from alpha to X-form, is coated onto an aluminum substrate to a thickness of about 10 microns and is cured. The plate is charged, exposed and developed as in Example X(a). An image is produced which is of satisfactory quality, but is neither as dense nor of as high resolution as that produced in Example X(a).

EXAMPLE X(c)

As a further control for the X-form phthalocyanine produced by the process of this invention, a plate is prepared as in Example X(a) except that the phthalocyanine used with the resin is prepared by the extended milling process described in Example I of copending application Ser. No. 505,723. X-form produced by that process is mixed with the resin solution of Example X(a), the solution is coated onto an aluminum substrate to a thickness of about 8 microns and the resin is cured. The plate is charged, exposed and developed as in Example X(a). An image of excellent quality, equal to that produced by the process of Example X(a).

As shown by Example X, exerographic plates utilizing X-form phthalocyanine produced by the process of this invention are superior to plates utilizing unconverted alpha-form phthalocyanine and are equal to those produced by the much longer and involved milling process.

Although specific components and proportions have been described in the above examples relating to methods of nucleated solvent crystallization of X-form metal-free phthalocyanine and to the use of this material in electrophotographic plates, other suitable materials, as listed above, may be used with similar results. In addition, other materials may be added to the solvent crystallization solutions or to the binder plate resin mixtures to synergize, enhance, or otherwise modify their properties.

Other modifications and ramifications of the present invention will occur to those skilled in the art upon a reading of the present disclosure. These are intended to be included within the scope of this invention.

What is claimed is:

1. A method for the preparation of metal-free phthalocyanine in X-form comprising:

(a) providing a metal-free phthalocyanine in the alpha-crystalline form;

(b) seeding said phthalocyanine with a minor of the X-form of metal-free phthalocyanine and an aliphatic organic solvent; and (c) maintaining said mixture at a temperature until at least a portion of said alpha-phthalocyanine is converted to the X-form thereof.

2. The method as defined in claim 1 wherein said mixture is maintained at said temperature and stirred until conversion to the X-form is complete.

3. The method as defined in claim 1 wherein said mixture contains an organic resin binder material.

4. The method as defined in claim 1 wherein said solvent contains carbonyl groups.

5. The method as defined in claim 1 wherein up to about 20% by weight of X-form phthalocyanine is added to the mixture based on the weight of alpha-phthalocyanine.

6. The method as defined in claim 1 wherein said mixture is maintained at a temperature of above about 25° C. during conversion.

7. The method as defined in claim 4 wherein said solvent is methylethylkeytone.

8. A method of providing an electrophotographic plate comprising phthalocyanine in the X-form comprising the steps of:

(a) preparing metal-free phthalocyanine in the X-form by the steps of providing a metal-free phthalocyanine in the alpha-crystalline form, seeding said phthalocyanine with a minor portion of the X-form of metal-free phthalocyanine and an aliphatic organic solvent, and maintaining said mixture at a temperature until at least a portion of said alpha-phthalocyanine is converted to the X-form thereof, (b) coating said mixture on a substrate, and (c) removing said solvent therefrom.

9. A method of preparing metal-free phthalocyanine in X-form comprising:

(a) providing a metal-free phthalocyanine in the alpha-crystalline form, (b) seeding said phthalocyanine with a minor portion of the X-form of metal-free phthalocyanine and an aliphatic organic solvent, and (c) maintaining said mixture at a temperature of above about 4° C. until at least a part of said phthalocyanine is converted to the X-form thereof.

References Cited

UNITED STATES PATENTS 3,357,989 12/1957 Byme et al. ---------- 96—1.5

GEORGE F. LESMES, Primary Examiner

J. P. BRAMMER, Assistant Examiner

U.S. Cl. X.R.

252—501; 260—314.5